B. F. Jewett,
Milk Pan.
No. 88,878. Patented Apr. 13, 1869.
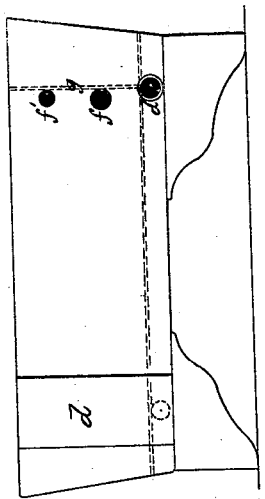
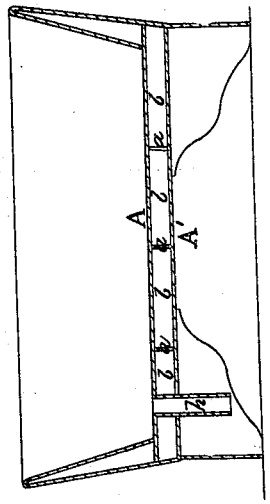
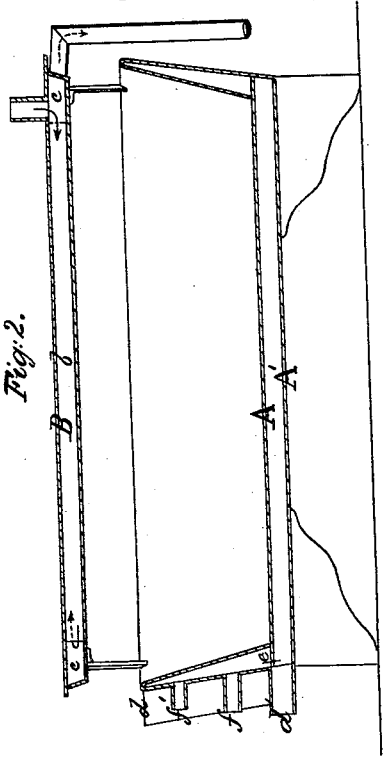
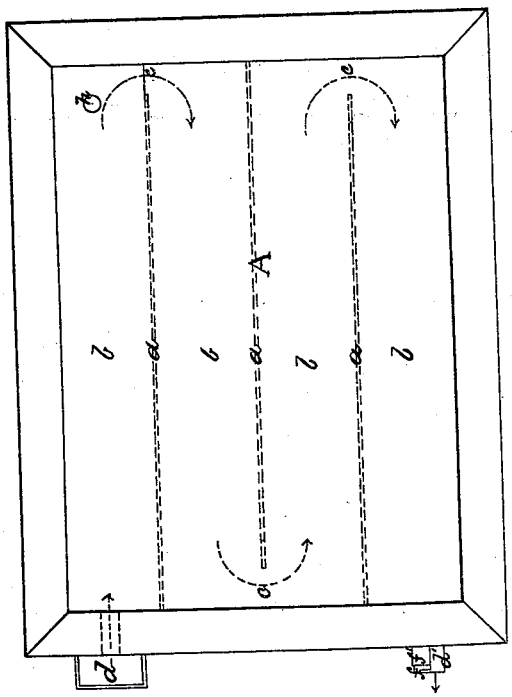
Witnesses:
J. W. Coombs
Fred. Haynes
Inventor:
B. F. Jewett
per Brown Coombs & Co
Atty.

UNITED STATES PATENT OFFICE.

BENJAMIN F. JEWETT, OF NORTH BANGOR, NEW YORK.

IMPROVEMENT IN MILK-PANS.

Specification forming part of Letters Patent No. 88,878, dated April 13, 1869.

*To all whom it may concern:*

Be it known that I, BENJAMIN F. JEWETT, of North Bangor, in the county of Franklin and State of New York, have invented a new and useful Improvement in Milk-Pans; and I do hereby declare that the following is a full, clear, and exact description of the same, reference being had to the accompanying drawings, which form part of this specification, and in which—

Figure 1 represents a plan view of a milk-pan constructed according to my improvement, with the cover removed. Fig. 2 represents a longitudinal section of the same, with the cover adjusted, and taken through the line $y\,y$; Fig. 3, a transverse section taken in the line $x\,x$, Fig. 1; and Fig. 4 represents an end view of the same.

Similar letters of reference indicate corresponding parts in the several figures.

In butter-making it is necessary to have the milk kept at a proper and uniform temperature, and to do this throughout the frequent changes of temperature is impossible with milk-pans of the ordinary construction.

The object of this invention is to obviate this difficulty; and to this end I construct a milk-pan with double walls and bottom—or, in other words, a pan within a pan—leaving a space between them, and having formed within said space any desirable number of compartments, communicating with each other in such manner as to form one continuous channel, with inlet and outlet, for admission and dismission of air, water, or steam brought to the desired degree of temperature, whereby the said air, water, or steam thus admitted into said space is compelled to traverse consecutively the entire length of each compartment before it can reach the place of discharge, thereby imparting to the inner pan and its contents a uniform degree of temperature approximating that of the passing fluid.

Referring to the accompanying drawings, A is the inner pan, and A' the outer one. These pans are arranged one within the other, and united at their upper edges, but are of sufficient difference of size otherwise to form a space between them along their bottoms and sides. That portion of said space which is formed between the bottoms of said pans is, by means of any number of parallel partitions, $a$, divided into compartments or channels $b$. These channels $b$ run parallel with each other, and are made to communicate each with its neighbor by means of openings $c$, formed at or near their ends, and upon opposite sides, so that cold air or water, or hot air or water, or steam raised or lowered to any desirable degree of temperature, admitted at the inlet $d$, will have to pass consecutively along the entire length of each channel $b$, traversing back and forth the space between the two pans, and so retained a length of time therein before it can reach the outlet $d'$.

When it is desirable that the circulation of the air, water, or steam should extend upward and flow also through the space between the sides as well as the bottoms of the vessel, the outlet $d'$ is closed, and the said fluid caused to pass through an opening, $e$, made in the wall of the said outlet-pipe, and to enter and rise in the said side space until it finds a means of exit through an upper outlet, $f$ or $f'$. Situated between the opening $e$ of the lower outlet and the upper outlets $f\,f$, and extending from the bottom to the top of the said space, is a vertical partition, $g$, so that communication cannot be had between said openings, except by a circuitous passage around the inner pan, thereby compelling the water, after passing through the opening $e$, to pass entirely around the said inner pan before reaching another outlet.

The top or cover B is made double, and the space formed between them is also divided into connecting compartments or channels, having inlet and outlet substantially similar to that of the bottom of the pan.

The milk is drawn off by means of a pipe, $h$, which passes through the bottoms of both pans, and through the space between them.

What I claim as my invention, and desire to have secured by Letters Patent, is—

1. A milk-pan constructed with double top, sides, and bottom, and having an open space or chamber between said double portions, for reception of a cooling or a warming medium, substantially as herein described.

2. The combination, with the above, of the compartments or channels $b$, communicating with each other, as described, and with inlet and outlet passages, whereby air, water, or steam admitted therein is caused to traverse consecutively each compartment or channel before reaching the outlet.

3. The combination, with the double sides of the pan, of the partition $g$, arranged relatively to the lower and the upper discharge-pipes $d'$ and $ff'$, substantially as and for the purpose herein set forth.

BENJAMIN F. JEWETT.

Witnesses:
WM. H. HYDE,
J. J. WILBER.